Patented Feb. 20, 1934

1,947,861

UNITED STATES PATENT OFFICE 1,947,861

PROCESS OF MAKING WATER SOLUBLE PETROLEUM SULPHONATES

Leo Liberthson, New York, N. Y., assignor to L. Sonneborn Sons, Inc., a corporation of Delaware No Drawing. Application April 1, 1931
Serial No. 527,048

5 Claims. (Cl. 260—159)

Highly refined petroleum products such as white oils, medicinal oils, certain grades of transformer oils, and other special products are produced by a process which involves the treatment of a petroleum oil with fuming sulphuric acid. In carrying out such a process, the oil is ordinarily mixed with a proportion of fuming sulphuric acid and agitated. This results in the formation of a black viscous sludge, insoluble in the oil phase and separable therefrom by stratification. The proportion of acid to oil may vary over considerable limits, for example, it may vary for any individual treat from 3 to 20% by volume of the original oil treated. After stratification and separation of the sludge the treatment may be repeated, and not infrequently, several successive treatments of this character are applied to a petroleum oil. The concentration of fuming acid employed for this purpose may likewise vary over wide limits, and may, for example, range from $H_2SO_4$ plus several percent of uncombined $SO_3$ up to pure sulphuric anhydride.

All such concentrations, including the anhydride, will be herein denoted by the term "fuming sulphuric acid". The sludges produced by this treatment and separated from the oil treated contain unconsumed sulphuric acid and considerable organic acids derived from the interaction of the fuming sulphuric acid with the oil. These organic acids may be hereinafter referred to as the green organic acids in contradistinction to other organic acids not characteristic of the said sludges. Such sludges may, for example, contain from 25 to 75% of organic acids depending upon the oil treated, mode of treatment, and number of previous treats. The organic acids referred to are soluble in water, and the salts thereof are ordinarily referred to as sulphonates.

Sludges containing a substantial amount of the green sulphonic acids, hereinabove referred to, are at times produced by the action of strong sulphuric acid of from 93 to 100%, $H_2SO_4$ content, on petroleum distillates, particularly lubricating oil distillates, and this result is ordinarily considered to be associated with distillates of high aromatic content, such as distillates derived from Californian and Gulf coastal crudes. Sludges of this character may also be subjected to my process with the result of generating the new product.

With the sludges derived from the fuming acid treatment of petroleum distillates, particularly lubricating oil distillates, the organic content of the sludges ordinarily consists predominantly of the green sulphonic acids, and after effecting the removal of part of the sulphuric acid, the organic acids may be directly neutralized to form crude petroleum sulphonates.

With the sludges resulting from the treatment of such distillates with non-fuming sulphuric acid, the organic content may contain a much larger proportion of asphaltic and/or tarry material; but in this case crude sulphonic acids may be separated by washing the material with water. It may be necessary to apply a number of water washes in succession as the sulphonic acids do not ordinarily pass into the water phase until by the application of successive washes the sulphuric acid content of the wash water has become considerably reduced. The sulphonic acids prepared in this manner may also be neutralized to form a crude water soluble sulphonate.

By a suitable treatment applied to the materials hereinbefore described, I am able to convert the same into a novel and more desirable product.

These acids and the water soluble salts thereof, such as the sodium salt as ordinarily prepared from the sludges mentioned, although apparently dissolving in water to form a solution, are not homogeneously water soluble but are actually composed of two substances, viz, an organic acid and a proportion of non-acid organic compounds which are not water soluble per se but are apparently carried into solution by the organic acid present or by the salt derived therefrom.

I am aware of the fact that the organic acids contained in sludges of the type hereinabove described have previously been separated in to two components, including, an organic acid which is predominantly water soluble, and an organic acid which when isolated is not highly soluble in water. Such acids cannot, however, be separated one from the other by the use of solvents of the type herein described. The non-acid organic compounds to which I refer do not belong to the organic acids mentioned, but are distinct and different compounds. They may consist in part of higher alcohols, disulphids, thio-ethers, thio-alcohols, and may comprise hydrocarbons. These substances will be generically referred to herein as the non-acid organic compounds.

In accordance with my process, I first remove the non-acid organic compounds from association with the green petroleum sulphonic acids. The term "petroleum sulphonic acids", as herein employed, unless specifically limited, is intended to embrace the petroleum sulphonic acids both in free and combined state. Either simultaneously with or subsequent to the removal, the green petroleum sulphonic acids are neutralized with a base forming a water soluble salt therewith. The term "base forming a water soluble salt", as herein employed, shall denote generally a base of the sodium group and also ammonia and the substituted ammonias, viz, the organic amines in which a methyl or ethyl radical has been substituted for one or more of the hydrogen atoms. The water soluble sulphonates so prepared in solution in a solvent is then applied as a film to a relatively smooth metal surface and heated to vaporize and drive off the solvent. This part of the operation may be performed in the apparatus known conventionally as "a drum drier". Any solvent in which the water soluble sulphonate is freely soluble appears to be satisfactory for this purpose. I have, in practice, employed water and aqueous solutions containing a water soluble organic solvent, such as for example aqueous solutions containing an alcohol or alcohols of not exceeding 3 carbon atoms to the molecule. I preferably employ an aqueous solution containing from 25 to 60 parts by weight of the sulphonates. When the purified water soluble petroleum sulphonates are subjected to this treatment, the material contracts in drying, cleavage lines are formed in the dried film which cause it to break up into a great number of irregular flakes or laminæ. The individual fragmentary flakes do not adhere firmly to the metal surface but tend to curl and either automatically dislodge themselves or hold on so loosely that they may be easily dislodged and removed without injury to the flake structure. In consequence of this, I am enabled to prepare the water soluble sulphonates in the form of irregular flakes or laminæ which constitute a particularly attractive and useful article of commerce. The individual flakes are translucent, clean, easy to handle or distribute, and relatively free from dust or extremely fine particles of any character. In addition to its attractive appearance, the product may be weighed or distributed without the formation of objectionable dust particles. The product may also be easily transferred in sacks or bags of open mesh construction without substantial loss. At the point of use the product may be distributed into the liquid medium in which it is to be employed without difficulty and dissolved with exceptional ease.

If the corresponding effort were made to dry the crude sulphonates by this means and without the preliminary removal of the non-acid organic compounds, the material would adhere to the metal drying surface so firmly that it would be necessary to scrape it off with the doctor-knife, and the product would be largely reduced to a fine rather hygroscopic powder. The superior behavior of the purified solvents I attribute to the removal of the non-acid organic compounds. I do not claim generically the removal of the non-acid organic compounds, but only the removal of the same in combination with the film drying whereby the new form of flakes or laminar sulphonate is produced.

Solution in water is not adequate to separate the organic acids from the non-acid organic compounds for as pointed out, the non-acid organic compounds are held in solution by the organic acid or salts therefrom. This separation may be effected by the use of an appropriate solvent, and while other solvents may be employed for this purpose, I preferably use an aqueous solution containing an alcohol of not exceeding 3 carbon atoms in proportion of 25 to 75% alcohol by volume. The preferred practice comprises the employment of an aqueous solution of ethyl alcohol containing from 40 to 60% ethyl alcohol by volume. The proportion of total solutes to total solvent at this stage may vary from one ninth to equal parts.

I may carry out this separation in acid solution, but I find it preferable to carry out this part of the process in a solution which has been made substantially neutral by first converting both the organic acids and sulphuric acid to water soluble salts such as sodium or potassium salts starting with the solution of the crude sulphonic acids in water. In ordinary practice, sodium is preferred. This treatment results in the formation of two layers. The upper layer contains the sodium salts of the organic acids. This layer is separated and the salts of the organic acids may be produced therefrom in substantially pure condition by evaporation and removal of the alcohol and water. Alternatively, the alcohol only may be removed leaving the salts of the organic acid in aqueous solution.

It is immaterial whether the non-acid organic compounds herein referred to exist as such in the original sludge or are formed therefrom as a result of dissolving the sludge in an aqueous medium, for example, by hydrolysis of certain components found in the sludge. Regardless of the mechanism by which these materials become associated with the organic acids or derivatives thereof, they will be hereinafter referred to as the non-acid organic compounds or as the associated non-acid organic compounds.

In practice I find it desirable to make a preliminary separation of sulphuric acid from the sludge, and while this separation can be made in any desired manner, for example, by mixing the sludge with saturated sodium chloride brine in quantity sufficient to form two liquid phases, I preferably effect this preliminary separation by admixing water with the sludge. If the quantity of water is carefully controlled, the sulphuric acid present in the sludge will operate to form two liquid phases, one comprising the bulk of the sulphuric acid originally present, while the other phase comprises the major part of the organic compounds originally present.

This separation may be expedited by steaming or heating the solution of sludge in water. In practice, the sludge is preferably heated for a period with an equal volume of water and permitted to stand until the two liquid phases are produced. It may be necessary to cool the entire mixture subsequent to heating in order to facilitate good separation of the two phases. The lower phase contains the bulk of the sulphuric acid originally present and may be reconcentrated or utilized in any other manner. The upper phase containing the major part of the organic compounds is selected and subjected to the purification treatment, hereinabove described.

Within the purview of my invention, I may, of course, evaporate and remove entirely the solvent from the organic acids and thereafter redissolve the organic acids in another or different solvent, provided only, of course, that the organic acids are suitably neutralized prior to the drying treatment. In actual practice, however, after the preliminary removal of sulphuric acid from the sludge, the latter is subjected to treatment with a solvent containing alcohol and water, as hereinbefore described, with the result of selectively dissolving the sulphonic acids. During this step, the sulphonic acids may be in the free state, but for maximum separation efficiency it is advisable that the solution be neutral to basic, and for this reason during this step the sulphonic acids are ordinarily combined with a base forming the sulphonates desired as the ultimate product. The effect of this treatment is to dissolve the sulphonic acids (free or combined as the case may be) to the exclusion of the non-acid organic compounds. On settling, the non-acid organic compounds separate and the solution containing the sulphonic acids is separately withdrawn and thereby separated from the undissolved non-acid organic compounds. This solution is then subjected to distillation to separate and recover the alcohol. If the preliminary separation of the non-acid organic compounds was conducted in acid condition, it is particularly important that the sulphonic acids be combined with a suitable base forming a water soluble sulphonate prior to the distillation operation, as this permits the distillation to be carried out in iron equipment without damage. The distillation is carried to the point at which the alcohol is vaporized, and conducted away for condensation and reuse. The residue in the still or evaporation vessel should constitute an aqueous solution containing from 25 to 60 parts by weight of the water soluble sulphonates. Some variation from these proportions is permissible, but for best results I have found it advisable to use a solution containing from 30 to 50 parts by weight of the sulphonates. This solution containing the sulphonates is applied as a film to the metal surface utilized for drying. While, of course, various apparatuses may be employed for this purpose, this step may conveniently be accomplished by the use of a conventional drum drier, in the operation of which the solution just mentioned is applied as a film to the drying rolls of the same. In the operation of the drum drier the solvent is evaporated, the resulting film of water soluble sulphonates contracts and splits into irregular flakes of laminæ which are only loosely attached to the surface of the roll, and are easily dislodged by the doctor-knife without dusting or injury to the flake-like structure.

The foregoing specific description is intended by way of illustration and not of limitation. It is my intention that the invention be limited only by the appended claims or their equivalents in which I have endeavored to claim broadly all inherent novelty.

I claim:

1. Process of forming water soluble petroleum sulphonates in laminar form from sludges resulting from the treatment of petroleum oils with sulphuric acid, and containing green petroleum sulphonic acids together with non-acid organic compounds, which comprises selectively removing the non-acid organic compounds and thereafter applying the organic acids in the form of salts formed by reacting said acids with a base, which base forms water soluble salts therewith, and with the said salts dissolved in a solvent, thereby forming a solution and applying said solution as a film to a relatively smooth metal surface, heating said surface to evaporate the solvent, dislodging and collecting the laminar fragments thereby formed.

2. Process of forming water soluble petroleum sulphonates in laminar form from sludges resulting from the treatment of petroleum oils with sulphuric acid, and containing green petroleum sulphonic acids together with non-acid organic compounds, which comprises separating the organic acids from the non-acid organic compounds by subjecting the material in neutral to basic solution to the action of a solvent in which the organic acids are relatively soluble and the non-acid organic compounds are relatively insoluble notwithstanding the presence of the organic acids, separating the solvent and dissolved organic acids from the relatively insoluble non-acid organic compounds, thereafter applying the organic acids in the form of salts formed by reacting said acids with a base, which base forms water soluble salts therewith, and with the said salts dissolved in a solvent, thereby forming a solution and applying said solution as a film to a relatively smooth metal surface, heating the surface to evaporate the solvent, dislodging and collecting the laminar fragments thereby formed.

3. Process of forming water soluble petroleum sulphonates in laminar form from sludges resulting from the treatment of petroleum oils with sulphuric acid, and containing green petroleum sulphonic acids together with non-acid organic compounds, which comprises separating the organic acids from the non-acid organic compounds by subjecting the material in neutral to basic solution to the action of a solvent in which the organic acids are relatively soluble and the non-acid organic compounds are relatively insoluble notwithstanding the presence of the organic acids, separating the said solvent and dissolved organic acids from the relatively insoluble non-acid organic compounds, and thereafter applying the said organic acids in the form of salts formed by reacting said acids with a base, which base forms water soluble salts therewith, and with the said salts dissolved in the said solvent, thereby forming a solution and applying said solution as a film to a relatively smooth metal surface, heating the surface to evaporate the solution, dislodging and collecting the laminar fragments thereby formed.

4. Process of forming water soluble petroleum sulphonates in laminar form from sludges resulting from the petroleum oils with sulphuric acid, and containing green petroleum sulphonic acids together with non-acid organic compounds, which comprises separating the organic acids from the non-acid organic compounds by subjecting the material in neutral to basic solution to the action of a solvent containing water and an alcohol of not exceeding 3 carbon atoms, in which solution the organic acids are relatively soluble and the non-acid organic compounds are relatively insoluble notwithstanding the presence of the organic acids, thereafter applying the organic acids in the form of salts formed by reacting said acids with a base, which base forms water soluble salts therewith, and with the said salts dissolved in a solvent, thereby forming a solution and applying said solution as a film to a relatively smooth metal surface, heating the surface to evaporate the solvent, dislodging and collecting the laminar fragments thereby formed.

5. Process of forming water soluble petroleum sulphonates in laminar form from sludges resulting from the treatment of petroleum oils with sulphuric acid and containing green petroleum sulphonic acids together with non-acid organic compounds, which comprises separating the organic acids from the non-acid organic compounds by subjecting the material in neutral to basic solution to the action of a solvent containing water and an alcohol of not exceeding 3 carbon atoms, in which solution the organic acids are relatively soluble and the non-acid organic compounds are relatively insoluble notwithstanding the presence of the organic acids, separating the said solvent and dissolved organic acids from the relatively insoluble non-acid organic compounds and thereafter applying the said organic acids in the form of salts formed by reacting said acids with a base, which base forms water soluble salts therewith, and with the said salts dissolved in the said solvent, thereby forming a solution and applying said solution as a film to a relatively smooth metal surface, heating the surface to evaporate the solution, dislodging and collecting the laminar fragments thereby formed.

LEO LIBERTHSON.